United States Patent [19]
Dew et al.

[11] Patent Number: 6,152,664
[45] Date of Patent: Nov. 28, 2000

[54] CARGO RESTRAINING APPARATUS

[76] Inventors: Robert W. Dew, 324 Logan St., Seymour, Tenn. 37865; Steven P. Dew, 2012 Woodrow Dr., Knoxville, Tenn. 37918

[21] Appl. No.: 09/234,100

[22] Filed: Jan. 20, 1999

[51] Int. Cl.⁷ .................................................. B60P 7/08
[52] U.S. Cl. .............................. 410/100; 410/97; 410/118
[58] Field of Search ................... 410/97, 100, 96, 410/117, 118; 296/100.15, 100.16; 24/169, 194, 196–198, 200, 68 CD, 265 CD

[56] References Cited

U.S. PATENT DOCUMENTS

| | | |
|---|---|---|
| 2,372,967 | 4/1945 | Martin . |
| 2,445,237 | 11/1948 | Davis . |
| 3,173,539 | 3/1965 | Looker . |
| 3,961,585 | 6/1976 | Brewer . |
| 4,365,391 | 12/1982 | Chapalain ................................. 24/197 |
| 4,493,135 | 1/1985 | Crook, Jr. ................................. 24/197 |
| 4,525,901 | 7/1985 | Krauss . |
| 4,571,783 | 2/1986 | Kasai . |
| 4,608,735 | 9/1986 | Kasai . |
| 4,637,099 | 1/1987 | Kasai . |
| 4,900,204 | 2/1990 | Summers ................................. 410/97 |
| 5,040,934 | 8/1991 | Ross .......................................... 410/97 |
| 5,193,955 | 3/1993 | Chou ....................................... 410/100 |
| 5,216,786 | 6/1993 | Anscher . |
| 5,243,741 | 9/1993 | Fudaki et al. . |
| 5,328,310 | 7/1994 | Lockney ................................... 410/97 |
| 5,458,447 | 10/1995 | Clason ..................................... 410/100 |
| 5,608,951 | 3/1997 | Chou . |
| 5,651,166 | 7/1997 | Lundsted . |
| 5,716,176 | 2/1998 | Anderson ................................. 410/118 |
| 5,772,371 | 6/1998 | Ackerman ............................... 410/118 |
| 5,848,864 | 12/1998 | Selby ........................................ 410/97 |
| 6,017,174 | 1/2000 | Ross et al. ............................... 410/100 |

*Primary Examiner*—Stephen T. Gordon
*Attorney, Agent, or Firm*—Ludeka, Neely & Graham, P.C.

[57] ABSTRACT

A cargo restraining apparatus includes a cargo net, a plurality of buckles, and a plurality of anchor straps. The cargo net is formed of a plurality of intersecting woven webs and is preferably rectangular with two nonintersecting, free ends of webs at each corner. Each of the buckles include a C-bar to which two nonintersecting, free ends of the cargo net are attached. An anchor strap having an anchor end and a free end is fed through the buckle and used to apply tension to the two nonintersecting, free ends when the anchor end is connected to an anchor and the free end is pulled in a direction generally toward the anchor. Each buckle also includes a release tab for releasing tension applied to the two nonintersecting, free ends. Each buckle is preferable fabricated from a single piece of molded plastic with no moving parts. The apparatus is particularly well suited for use in securing cargo in the bed of a pick-up truck.

20 Claims, 4 Drawing Sheets

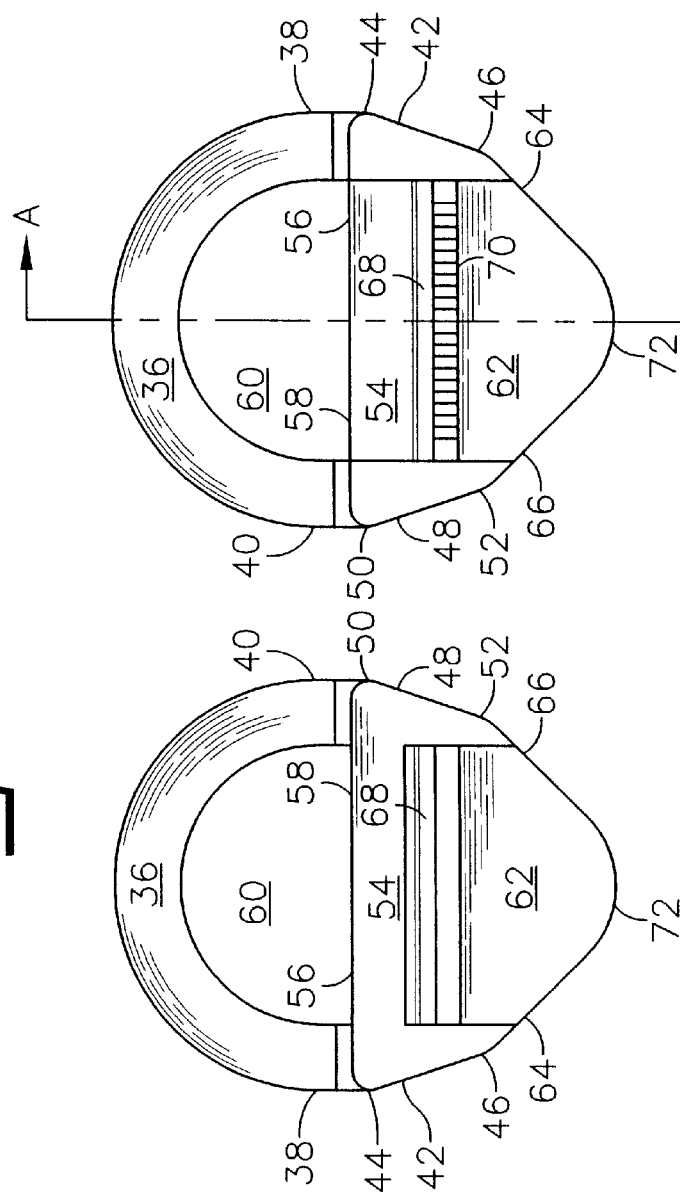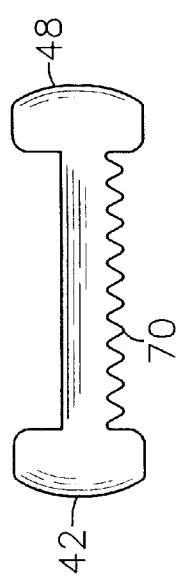

CARGO RESTRAINING APPARATUS

TECHNICAL FIELD

The present invention relates generally to the art of restraining cargo in a vehicle during transportation. More particularly, it relates to a cargo restraining apparatus for securing cargo in the bed of a pick-up truck.

BACKGROUND

Vehicles such as pick-up trucks are often used to transport various types of cargo from one location to another. Transporting cargo in a motor vehicle poses a number of hazards. For example, certain types of cargo can easily be toppled, ejected from the vehicle, or otherwise shifted during transportation, which can pose significant hazards to pedestrians and other motorists who are in the path of the ejected cargo. Shifting cargo can also upset the balance of the vehicle which can lead to loss of control of the vehicle. Even when shifting cargo is contained within the vehicle's cargo area, the cargo itself may become damaged. It is therefore important to secure the cargo within the vehicle during transportation.

Various devices have been employed in the past in an effort to secure cargo within a vehicle. Many of these devices, however, are heavy, complex, and difficult to use. For example, U.S. Pat. No. 5,458,447 to Clason discloses a cargo restraining device having a lattice webbing with longitudinal straps and latitudinal straps. Every other latitudinal strap includes a latitudinally extending portion, an in-line buckle attached to the latitudinally extending portion, and an anchoring strap with a flat hook. For the embodiment shown in FIG. 1 of the Clason patent, a total of ten buckles and ten flat hooks are required. All ten hooks must be anchored at some point on the vehicle and all ten buckles must be adjusted for the Clason device to function properly. For many vehicles, finding an appropriate anchor point for each of the flat hooks could prove difficult.

What is needed, therefore, is an apparatus that can restrain cargo in a vehicle in an effective and efficient manner. The apparatus should be lightweight and easy to use.

SUMMARY

With regard to the foregoing and other objects, the invention in one aspect provides a strap tensioning apparatus for adjusting, holding, and releasing tension on a strap of web material. The apparatus includes a semicircular shaped C-bar having a first end and a second end in opposed relation to the first end. First and second side bars are attached to the C-bar and to a cross bar such that the cross bar is perpendicular to each of the side bars. The configuration of the C-bar, side bars, and cross bar define a through opening having a substantially semicircular dimension for receiving one or more straps of web material. A locking bar is attached perpendicular to each of the side bars and parallel to the cross bar so that a slot is defined between the locking bar and the cross bar. An anchor strap having an anchor end and a free end is passed through the through opening, around the cross bar, and through the slot so that the free end of the anchor strap is slidingly positioned between the anchor end of the anchor strap and the locking bar. Tension is applied to the strap of web material when the anchor end of the anchor strap is connected to an anchor and the free end of the anchor strap is pulled in a direction generally toward the anchor.

A release tab is connected to the locking bar for rotating the locking bar away from the free end of the anchor strap to reduce tension applied to the strap of web material. The release tab and the C-bar lie in a common plane. The locking bar preferably includes a serrated edge adjacent the free end of the anchor strap to hold tension on the strap of web material.

Preferably, the C-bar, first and second side bars, cross bar, and locking bar are fabricated as a single piece with no moving parts.

The invention also provides an apparatus for securing cargo in the cargo area of a vehicle. The apparatus includes a cargo net having a periphery and formed of a plurality of intersecting webs for entrapping cargo and inhibiting movement of entrapped cargo in the cargo area of a vehicle. The cargo net also includes a plurality of nonintersecting, free ends of webs adjacent the periphery. A plurality of buckles, similar to the strap tensioning apparatus described above, are provided where each buckle includes a C-bar to which one or more of the nonintersecting, free ends of the cargo net are connected. An anchor strap is fed through each buckle as described above, and tension is applied to the nonintersecting, free ends of the cargo net when the free end of the anchor strap is pulled in a direction generally toward the anchor.

The cargo net may be further defined as including a plurality of parallel, longitudinal web members having substantially the same length and defining the length of the cargo net. A plurality of parallel, latitudinal web members having substantially the same length defines the width of the cargo net—the cargo net being substantially rectangular with four corners. The periphery of the cargo net is bounded by first and last longitudinal web members and first and last latitudinal web members. Each corner of the net is defined by a nonintersecting, free end of a longitudinal web member and a nonintersecting, free end of an adjacent latitudinal web member. The two nonintersecting, free ends of adjacent longitudinal and latitudinal web members form a corner of the cargo net and are connected to the C-bar of a buckle.

In a further embodiment of the invention, a pick-up truck capable of transporting cargo is provided. The pick-up truck includes a cargo bed having a substantially rectangular dimension with four corners, a cargo tie down adjacent each corner of the cargo bed, and a cargo net with buckles and anchor straps as described above.

BRIEF DESCRIPTION OF THE DRAWINGS

The above and other features, aspects and advantages of the present invention will now be discussed in the following detailed description and appended claims considered in conjunction with the accompanying drawings in which:

FIG. 3A is a top view of a buckle in accordance with the invention;

FIG. 3B is a bottom view of the buckle of FIG. 3A;

FIG. 3C is a side view of the buckle of FIG. 3A;

FIG. 3D is a front view of the buckle of FIG. 3A;

DETAILED DESCRIPTION OF A PREFERRED EMBODIMENT

Figure 1:
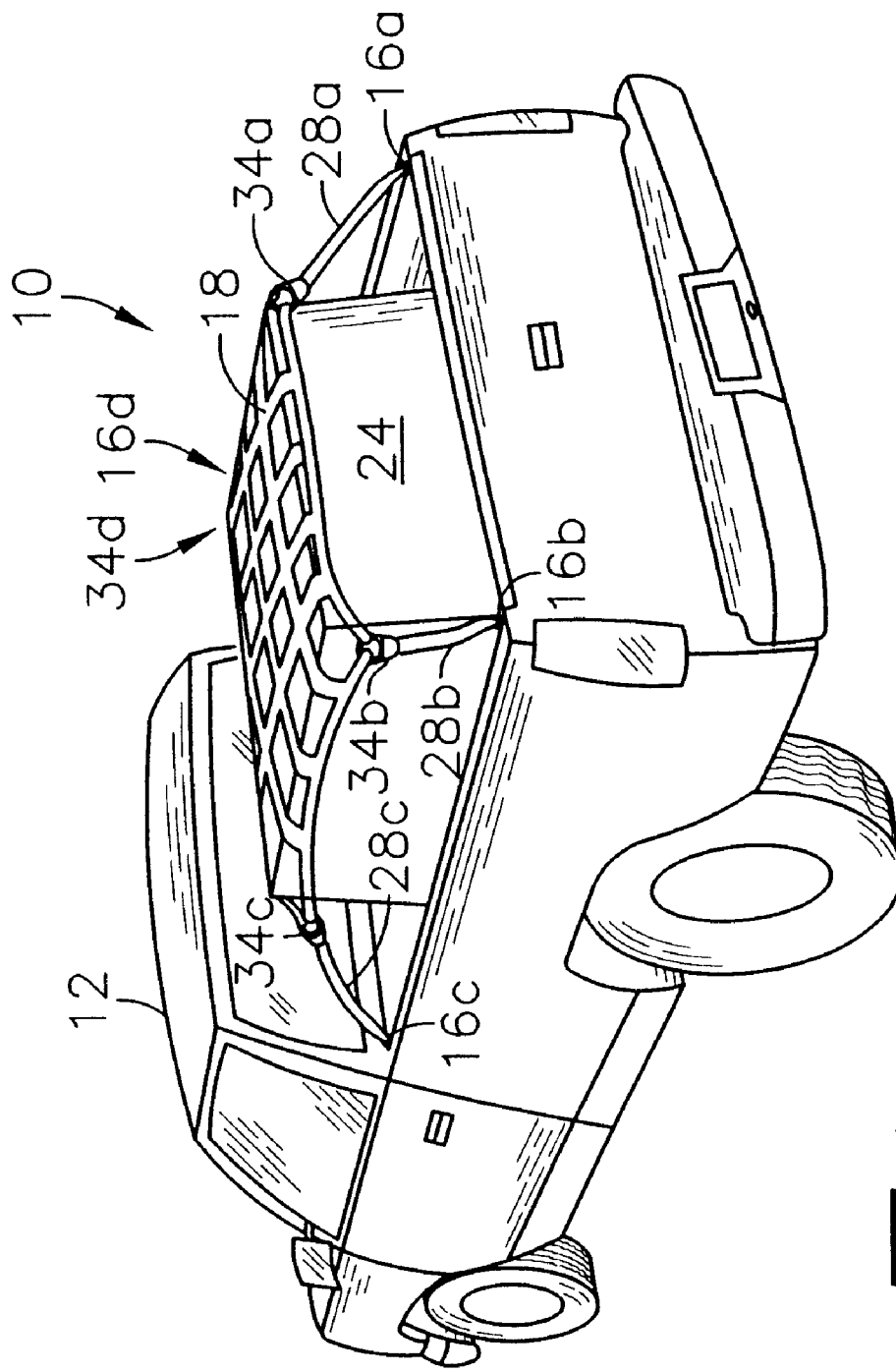
FIG. 1 is an isometric drawing of a pick-up truck with cargo secured in the truck bed by a cargo restraining apparatus in accordance with the invention.

With reference now to the drawings in which like reference characters designate like or similar parts throughout the several views, FIG. 1 shows a cargo restraining apparatus 10 for securing cargo during transportation. In the embodiment shown in FIG. 1, the cargo restraining apparatus 10 is used to secure cargo 24 within the bed of a pick-up truck 12 by attaching the apparatus 10 to tie downs 16a–d positioned at the corners of the truck bed. However, it will be understood that the invention contemplates use of the cargo restraining apparatus for securing a variety of cargo types in a variety of vehicle types, including tractor trailers, trains, aircraft, and watercraft.

Figure 2:
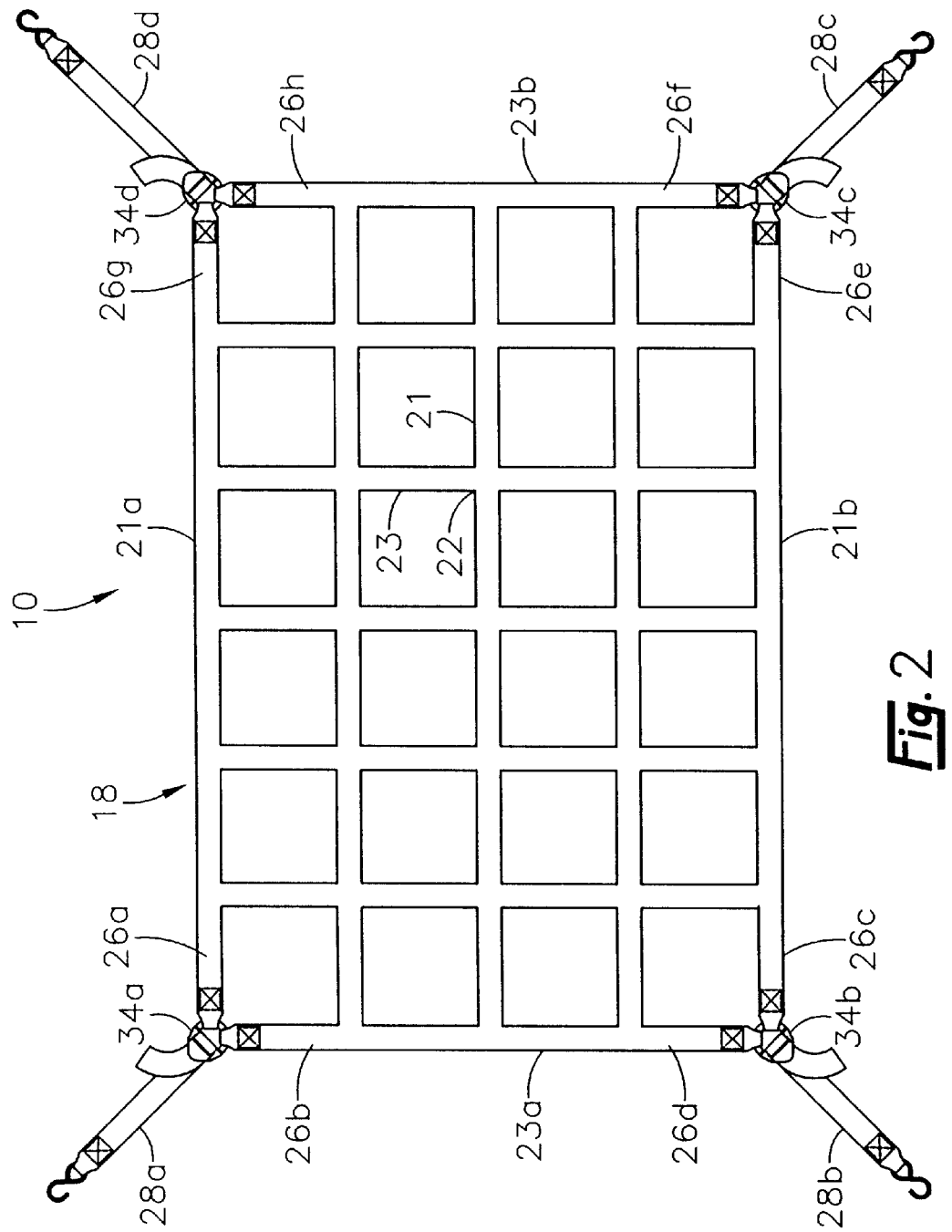
FIG. 2 is a plan view of a cargo net with buckles employed in the cargo restraining apparatus shown in FIG. 1.

With continued reference to FIG. 1 and with further reference to the plan view of the cargo restraining apparatus 10 shown in FIG. 2, the major elements of the cargo restraining apparatus 10 include a cargo net 18, a plurality of buckles 34a–d, and a plurality of anchor straps 28a–d. The cargo net 18 is fabricated of a plurality of intersecting webs woven from materials such as polypropylene, polyester, and nylon. The cargo net 18 has a plurality of longitudinal webs, including longitudinal web 21, which intersect with a plurality of latitudinal webs, including latitudinal web 23 to form a web lattice as shown in FIG. 2. The intersection of longitudinal web 21 and latitudinal web 23 is shown at 22. Although FIG. 2 shows a cargo net with five longitudinal webs and seven latitudinal webs, the number, spacing and lengths of the longitudinal and latitudinal webs may be varied as needed. Also, while a rectangular (including square) cargo net 18 is shown in the preferred embodiment of FIG. 2, the cargo net 18 may be of some other shape, such as circular, triangular, and hexagonal.

The cargo net 18 is bounded by a periphery which includes the two outermost longitudinal webs 21a and 21b and the two outermost latitudinal webs 23a and 23b. At each corner of the cargo net are two nonintersecting, free ends 26a–h of two adjacent peripheral webs. For example, the upper left hand corner of the cargo net 18 shown in FIG. 2 includes a free end 26a of longitudinal web 21a and a free end 26b of latitudinal web 23a. Likewise, the lower left hand corner of the cargo net 18 includes the nonintersecting free end 26c of longitudinal web 21b and the nonintersecting free end 26d of latitudinal web 23a. A strap tensioning apparatus, or buckle 34a–d, is attached at each corner of the cargo net 18 by adjacent nonintersecting, free ends 26a–h as further described below. If desired, additional buckles with anchor straps may be employed at points along the peripheral longitudinal webs 21a and 21b and/or at points along the peripheral latitudinal webs 23a and 23b.

Referring now to FIGS. 3A–D, the configuration of the buckles 34a–d will now be described where FIG. 3A is top view of buckle 34a, FIG. 3B is a bottom view of buckle 34a, FIG. 3C is side view of buckle 34a, and FIG. 3D is a front view of buckle 34a. The buckle 34a is preferably fabricated as a single piece with no moving parts. In a preferred embodiment, the buckle 34a is a single piece of molded plastic with no moving parts, which makes the buckle 34a lightweight. The plastic material from which the buckle 34a is fabricated also reduces the likelihood that the buckle 34a will inadvertently scratch or otherwise damage the truck 12 during use.

The buckle 34a includes a C-bar 36 having a first end 38 and a second end 40 in opposed relation to the first end 38. As can be seen, the C-bar 36 is substantially semicircular in shape. A first side bar 42 includes a first end 44 attached to the first end 38 of the C-bar 36 and a second end 46 attached to a locking bar 62. A second side bar 48 includes a first end 50 attached to the second end 40 of the C-bar 36 and a second end 52 attached to the locking bar 62.

The buckle 34a further includes a cross bar 54 having a first end 56 and a second end 58. The first end 56 of the cross bar 54 is connected to the first end 44 of the first side bar 42. The second end 58 of cross bar 54 is connected to the first end 50 of the second side bar 48. The C-bar 36, the first and second side bars 42 and 48 and the cross bar 54 define a through opening 60 having a substantially semicircular dimension. The nonintersecting free ends 26a and 26b are attached to the C-bar 36, as further described below.

The buckle 34a also includes a locking bar 62. The locking bar 62 has a first end 64 which is connected to the second end 46 of the first side bar 42, and a second end 66 which is connected to the second end 52 of the second side bar 48. The locking bar 62 is perpendicular to the side bars 42 and 48 and parallel to the cross bar 54. A slot 68 is formed between the cross bar 54 and the locking bar 62.

Figure 4:
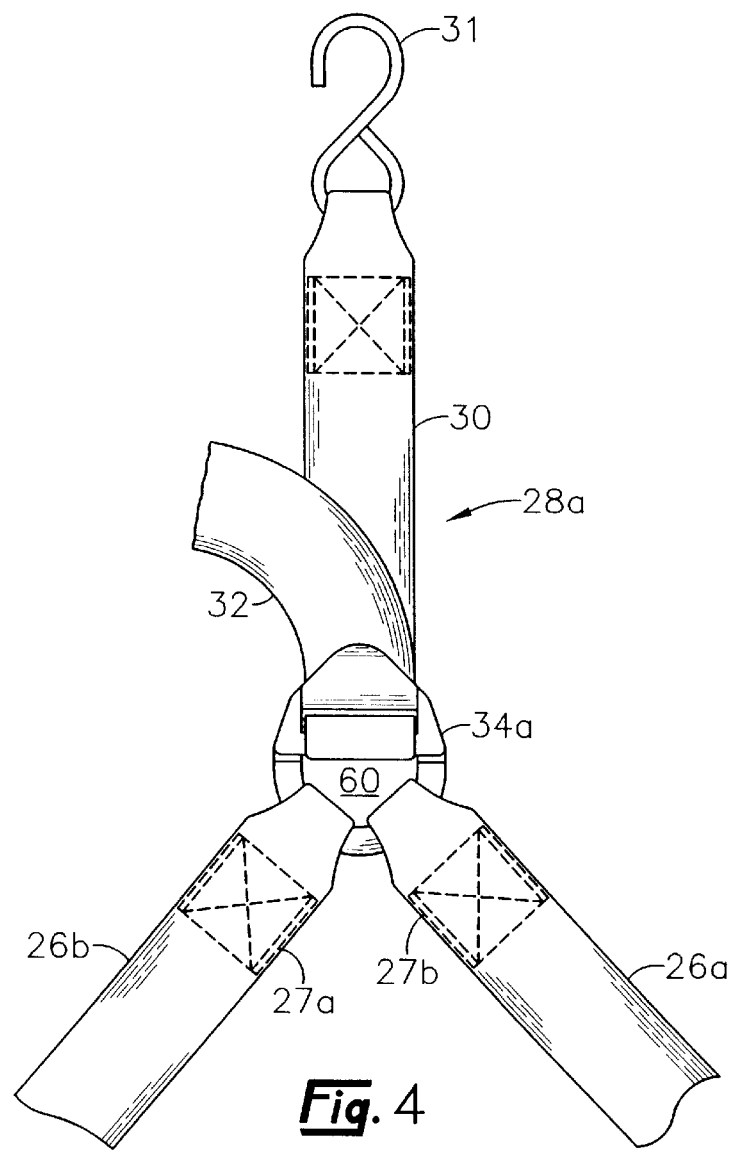
FIG. 4 is a sectional view of the cargo net of FIG. 2 showing a corner buckle with anchor strap.

FIG. 4 is a sectional view of the apparatus 10 of FIG. 2 which shows a preferred embodiment for attaching buckle 34a to the nonintersecting free ends 26a and 26b. To attach the nonintersecting free ends 26a, 26b to the C-bar 36, the free ends 26a, 26b are passed through the through opening 60 and sewn to themselves as shown at stitchings 27a and 27b. An anchor strap 28a is also attached to the buckle 34a. The anchor strap 28a has an anchor end 30 which includes a hook 31 or other attachment member for being attached to an anchor, such as a tie down 16a as shown in FIG. 1. The anchor strap 28a also includes a free end 32.

Referring again to FIGS. 3B and 3D and with continued referenced to FIG. 4, the buckle preferably includes a serrated edge 70. The serrated edge 70 is attached to the lower surface of the locking bar 62. The serrated edge 70 directly contacts the free end 32 of the anchor strap 28 (FIG. 4), which helps to prevent slippage of the anchor strap 28 under tension without damaging the anchor strap 28. In a preferred embodiment, the serrated edge 70 is integrally formed with the buckle 34a.

The semicircular dimension of the C-bar 36 enables the nonintersecting free ends 26a, 26b to slide along the length of the C-bar 36 as load forces dictate. This enables the nonintersecting free ends 26a and 26b to adjust to many angles and to provide a more even distribution of load forces throughout the apparatus 10. When load forces are most evenly distributed throughout the apparatus 10, the nonintersecting free ends 26a and 26b form a 90° angle in relation to each other. However, as stated above, the semicircular dimension of the C-bar 36 enables the nonintersecting free ends 26a and 26b to slide along the C-bar 36 as load forces dictate and adjust to a wide range of angles in relation to each other to compensate for varying sizes and shapes of cargo 24.

Figure 5:
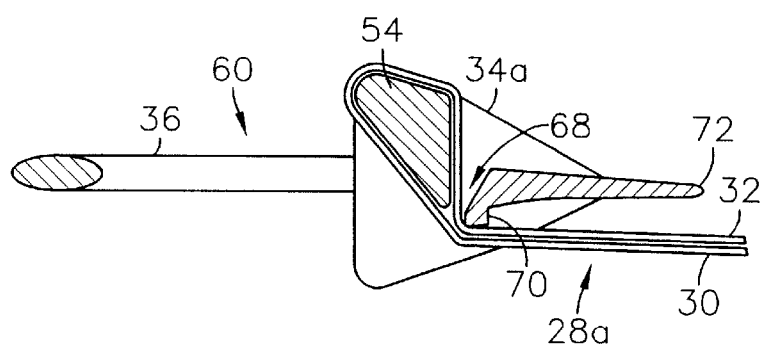
FIG. 5 is a cross-section view of the buckle of FIG. 3A.

FIG. 5 is a cross-section view of the buckle 34a taken along cross-section line A–A' (FIG. 3B) with the anchor strap 28a attached. The anchor strap 28a is attached to the buckle 34a by passing the free end 32 through the through opening 60, around the cross bar 54, and through the slot 68 formed between the cross bar 54 and the locking bar 62 so that the free end 32 of the anchor strap 28a is slidingly positioned between the anchor end 30 of the anchor strap 28a and the locking bar 62. Tension is applied to the nonintersecting free ends 26a and 26b by attaching the anchor end 30 to an anchor, such as tie down 16a shown in FIG. 1, and pulling the free end 32 of the anchor strap 28a in a direction generally toward the anchor 16a. Tension is applied to the anchor end 32 and free end 30, which causes compression of the free end 32 against the serrated edge 70 to prevent slippage.

The anchor end 30 of the anchor strap 28a is defined as that part of the anchor strap 28a which is between the anchor 16a and the cross bar 54. The free end 32 of the anchor strap 28a is that portion which has passed beyond the cross bar 54 and through the slot 68. Because the anchor strap 28a is adjustable, the lengths of the anchor end 30 and the free end 32 can vary. As the anchor strap 28a is tightened, the length of the free end 32 will increase and the length of the anchor end 30 will correspondingly decrease. Likewise, when the anchor strap 28a is loosened, the length of the free end 32 will decrease and the length of the anchor end 30 will proportionately increase.

Referring again to FIGS. 3A–D, the buckle 34a includes a release tab 72 which is connected to the locking bar 62. When the release tab 72 is moved in a direction away from the free end 32 of the anchor strap 28a, the locking bar 62 is moved away from the free end 32 of the anchor strap 28a and tension applied to the free end 32 of the anchor strap 28a is reduced thereby allowing the anchor strap 28a to slide through the buckle 34a to release tension. Also, as shown in FIG. 3C, the release tab 72, locking bar 62, and C-bar 36 each lie in a common plane Y.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A strap tensioning apparatus comprising:
    a first strap of web material;
    a C-bar having a first end and a second end in opposed relation to the first end, said C-bar having a substantially semicircular dimension beginning at the first end and terminating at the second end;
    a first side bar having a first end connected to the first end of the C-bar and having a second end;
    a second side bar having a first end connected to the second end of the C-bar and having a second end;
    a cross bar having a first end connected to the first end of the first side bar and a second end connected to the first end of the second side bar so that the cross bar is perpendicular to each of the side bars;
    wherein said C-bar, said first side bar, said second side bar, and said cross bar define a through opening having a substantially semicircular dimension for receiving said first strap of web material;
    an anchor strap of web material having an anchor end and a free end; and
    a locking bar having a first end connected to the second end of the first side bar and a second end connected to the second end of the second side bar so that the locking bar is perpendicular to each of the side bars and parallel to said cross bar, said locking bar and said cross bar defining a slot therebetween for receiving said anchor strap where the free end of the anchor strap is fed through the through opening, around the cross bar, and through the slot so that the free end of the anchor strap is slidingly positioned between the anchor end of the anchor strap and the locking bar;
    wherein tension is applied to said first strap when the anchor end of the anchor strap is connected to an anchor and the free end of the anchor strap is pulled in a direction generally toward the anchor.

2. The apparatus of claim 1, further comprising a release tab connected to said locking bar for moving said locking bar away from the free end of said anchor strap to reduce tension applied to the first strap.

3. The apparatus of claim 2 wherein said C-bar and said release tab lie in a common plane.

4. The apparatus of claim 1 wherein said locking bar includes a serrated edge adjacent the free end of the anchor strap.

5. The apparatus of claim 1 wherein said C-bar, said first and second side bars, said cross bar, and said locking bar are fabricated as a single piece with no moving parts.

6. An apparatus for securing cargo to the cargo area of a vehicle, the apparatus comprising:
    a cargo net having a periphery and formed of a plurality of intersecting webs for entrapping cargo and inhibiting movement of entrapped cargo in the cargo area of a vehicle, said cargo net including a plurality of nonintersecting, free ends of webs adjacent the periphery;
    a plurality of anchor straps formed of a web material having an anchor end and a free end; and
    a plurality of buckles, each of said plurality of buckles including:
        a C-bar having a first end and a second end in opposed relation to the first end, said C-bar having a substantially semicircular dimension beginning at the first end and terminating at the second end, wherein one or more of said nonintersecting, free ends of the cargo net are connected to the C-bar;
        a first side bar having a first end connected to the first end of the C-bar and having a second end;
        a second side bar having a first end connected to the second end of the C-bar and having a second end;
        a cross bar having a first end connected to the first end of the first side bar and a second end connected to the first end of the second side bar so that the cross bar is perpendicular to each of the side bars;
        wherein said C-bar, said first side bar, said second side bar, and said cross bar define a through opening having a substantially semicircular dimension; and
        a locking bar having a first end connected to the second end of the first side bar and a second end connected to the second end of the second side bar so that the locking bar is perpendicular to each of the side bars and parallel to said cross bar, said locking bar and said cross bar defining a slot therebetween for receiving an anchor strap, wherein the free end of the anchor strap is fed through the through opening, around the cross bar, and through the slot so that the free end of the anchor strap is slidingly positioned between the anchor end of the anchor strap and the locking bar;
        wherein tension is applied to said one or more nonintersecting, free ends when the anchor end of the anchor strap is connected to an anchor point on the vehicle and the free end of the anchor strap is pulled in a direction generally toward the anchor.

7. The apparatus of claim 6 wherein said cargo net includes:
    a plurality of parallel, longitudinal web members having substantially the same length and defining the length of the cargo net; and
    a plurality of parallel, latitudinal web members having substantially the same length and defining the width of the cargo net, said cargo net being substantially rectangular with four corners;

wherein said cargo net includes said periphery bounded by first and last ones of said longitudinal web members and first and last ones of said latitudinal web members, each corner of the cargo net being defined by a nonintersecting, free end of a longitudinal web member and a nonintersecting, free end of an adjacent latitudinal web member, wherein the two nonintersecting, free ends of adjacent longitudinal and latitudinal web members forming a corner of the cargo net are connected to the C-bar of respective ones of said buckles.

8. The apparatus of claim 6, wherein each of said plurality of buckles includes a release tab connected to said locking bar for moving said locking bar away from the free end of said anchor strap to reduce tension applied to said one or more nonintersecting, free ends.

9. The apparatus of claim 8 wherein said C-bar and said release tab lie in a common plane.

10. The apparatus of claim 6 wherein said locking bar includes a serrated edge adjacent the free end of the anchor strap.

11. The apparatus of claim 6 wherein each of said buckles are fabricated from a single piece of molded plastic with no moving parts.

12. A pick-up truck capable of transporting cargo, the pick-up truck comprising:
a cargo bed having a substantially rectangular dimension with four-corners;
a cargo tie-down adjacent each corner of the cargo bed;
a cargo net having a periphery and formed of a plurality of intersecting webs for entrapping cargo and inhibiting movement of entrapped cargo in the cargo bed of the truck, said cargo net including a plurality of nonintersecting, free ends of webs adjacent the periphery;
a plurality of anchor straps formed of a web material having an anchor end and a free end; and
a plurality of buckles, each of said plurality of buckles including:
a C-bar having a first end and a second end in opposed relation to the first end, said C-bar having a substantially semicircular dimension beginning at the first end and terminating at the second end, wherein one or more of said nonintersecting, free ends of the cargo net are connected to the C-bar;
a first side bar having a first end connected to the first end of the C-bar and having a second end;
a second side bar having a first end connected to the second end of the C-bar and having a second end;
a cross bar having a first end connected to the first end of the first side bar and a second end connected to the first end of the second side bar so that the cross bar is perpendicular to each of the side bars;
wherein said C-bar, said first side bar, said second side bar, and said cross bar define a through opening having a substantially semicircular dimension; and
a locking bar having a first end connected to the second end of the first side bar and a second end connected to the second end of the second side bar so that the locking bar is perpendicular to each of the side bars and parallel to said cross bar, said locking bar and said cross bar defining a slot therebetween for receiving an anchor strap, wherein the free end of the anchor strap is fed through the through opening, around the cross bar, and through the slot so that the free end of the anchor strap is slidingly positioned between the anchor end of the anchor strap and the locking bar;

wherein tension is applied to said one or more nonintersecting, free ends when the anchor end of the anchor strap is connected to a tie-down and the free end of the anchor strap is pulled in a direction generally toward the tie-down.

13. The apparatus of claim 12 wherein said cargo net includes:
a plurality of parallel, longitudinal web members having substantially the same length and defining the length of the cargo net; and
a plurality of parallel, latitudinal web members having substantially the same length and defining the width of the cargo net, said cargo net being substantially rectangular with four corners;
wherein said cargo net includes said periphery bounded by first and last ones of said longitudinal web members and first and last ones of said latitudinal web members, each corner of the cargo net being defined by a nonintersecting, free end of a longitudinal web member and a nonintersecting, free end of an adjacent latitudinal web member, wherein the two nonintersecting, free ends of adjacent longitudinal and latitudinal web members forming a corner of the cargo net are connected to the C-bar of respective ones of said buckles.

14. The apparatus of claim 12, wherein each of said plurality of buckles includes a release tab connected to said locking bar for moving said locking bar away from the free end of said anchor strap to reduce tension applied to said one or more nonintersecting, free ends.

15. The apparatus of claim 14 wherein said C-bar and said release tab lie in a common plane.

16. The apparatus of claim 12 wherein said locking bar includes a serrated edge adjacent the free end of the anchor strap.

17. The apparatus of claim 12 wherein each of said buckles are fabricated from a single piece of molded plastic with no moving parts.

18. A strap tensioning apparatus for adjusting, holding, and releasing tension on a strap of web material, the apparatus comprising:
a C-bar having a first end and a second end in opposed relation to the first end, said C-bar having a substantially semicircular dimension beginning at the first end and terminating at the second end for receiving a first strap of web material;
a first side bar having a first end connected to the first end of the C-bar and having a second end;
a second side bar having a first end connected to the second end of the C-bar and having a second end;
a cross bar having a first end connected to the first end of the first side bar and a second end connected to the first end of the second side bar so that the cross bar is perpendicular to each of the side bars;
wherein said C-bar, said first side bar, said second side bar, and said cross bar define a through opening having a substantially semicircular dimension for receiving said first strap of web material;
a locking bar having a first end connected to the second end of the first side bar and a second end connected to the second end of the second side bar so that the locking bar is perpendicular to each of the side bars and parallel to said cross bar, said locking bar and said cross bar defining a slot therebetween for receiving an anchor strap of web material having an anchor end and a free end where the free end of the anchor strap is fed through the through opening, around the cross bar, and through the slot so that the free end of the anchor strap is slidingly positioned between the anchor end of the anchor strap and the locking bar;

wherein tension is applied to said first strap when the anchor end of the anchor strap is connected to an anchor and the free end of the anchor strap is pulled in a direction generally toward the anchor; and wherein said C-bar, said first and second side bars, said cross bar, and said locking bar are fabricated as a single piece with no moving parts.

19. A strap tensioning apparatus for adjusting, holding, and releasing tension on a strap of web material, the apparatus comprising:

a C-bar having a first end and a second end in opposed relation to the first end, said C-bar having a substantially semicircular dimension beginning at the first end and terminating at the second end for receiving a first strap of web material;

a first side bar having a first end connected to the first end of the C-bar and having a second end;

a second side bar having a first end connected to the second end of the C-bar and having a second end;

a cross bar having a first end connected to the first end of the first side bar and a second end connected to the first end of the second side bar so that the cross bar is perpendicular to each of the side bars;

wherein said C-bar, said first side bar, said second side bar, and said cross bar define a through opening having a substantially semicircular dimension for receiving said first strap of web material;

a locking bar having a first end connected to the second end of the first side bar and a second end connected to the second end of the second side bar so that the locking bar is perpendicular to each of the side bars and parallel to said cross bar, said locking bar and said cross bar defining a slot therebetween for receiving an anchor strap of web material having an anchor end and a free end where the free end of the anchor strap is fed through the through opening, around the cross bar, and through the slot so that the free end of the anchor strap is slidingly positioned between the anchor end of the anchor strap and the locking bar;

wherein tension is applied to said first strap when the anchor end of the anchor strap is connected to an anchor and the free end of the anchor strap is pulled in a direction generally toward the anchor; and a release tab connected to said locking bar for moving said locking bar away from the free end of said anchor strap to reduce tension applied to the first strap.

20. A strap tensioning apparatus for adjusting, holding, and releasing tension on a strap of web material, the apparatus comprising:

a C-bar having a first end and a second end in opposed relation to the first end, said C-bar having a substantially semicircular dimension beginning at the first end and terminating at the second end for receiving a first strap of web material;

a first side bar having a first end connected to the first end of the C-bar and having a second end;

a second side bar having a first end connected to the second end of the C-bar and having a second end;

a cross bar having a first end connected to the first end of the first side bar and a second end connected to the first end of the second side bar so that the cross bar is perpendicular to each of the side bars;

wherein said C-bar, said first side bar, said second side bar, and said cross bar define a through opening having a substantially semicircular dimension for receiving said first strap of web material; and a locking bar having a first end connected to the second end of the first side bar and a second end connected to the second end of the second side bar so that the locking bar is perpendicular to each of the side bars and parallel to said cross bar, said locking bar and said cross bar defining a slot therebetween for receiving an anchor strap of web material having an anchor end and a free end where the free end of the anchor strap is fed through the through opening, around the cross bar, and through the slot so that the free end of the anchor strap is slidingly positioned between the anchor end of the anchor strap and the locking bar, said locking bar including a serrated edge adjacent the free end of the anchor strap;

wherein tension is applied to said first strap when the anchor end of the anchor strap is connected to an anchor and the free end of the anchor strap is pulled in a direction generally toward the anchor.

* * * * *